United States Patent
Bao et al.

(10) Patent No.: US 11,576,143 B2
(45) Date of Patent: Feb. 7, 2023

(54) SIDELINK ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/143,028

(22) Filed: Jan. 6, 2021

(65) Prior Publication Data

US 2022/0217674 A1 Jul. 7, 2022

(51) Int. Cl.
| | |
|---|---|
| *H04W 4/00* | (2018.01) |
| *H04W 64/00* | (2009.01) |
| *H04W 4/40* | (2018.01) |
| *G01S 5/02* | (2010.01) |
| *H04L 25/02* | (2006.01) |
| *H04W 4/02* | (2018.01) |
| *H04W 24/10* | (2009.01) |
| *H04W 72/04* | (2023.01) |

(52) U.S. Cl.
CPC ......... *H04W 64/006* (2013.01); *G01S 5/0284* (2013.01); *H04L 25/0226* (2013.01); *H04W 4/023* (2013.01); *H04W 4/40* (2018.02); *H04W 24/10* (2013.01); *H04W 72/0406* (2013.01)

(58) Field of Classification Search
None
See application file for complete search history.

(56) References Cited

U.S. PATENT DOCUMENTS

| | | |
|---|---|---|
| 2004/0214584 A1 | 10/2004 | Marinier |
| 2016/0095080 A1* | 3/2016 | Khoryaev ............. H04W 76/14 |
| | | 455/456.1 |
| 2020/0092685 A1* | 3/2020 | Fehrenbach ............ H04W 4/46 |

OTHER PUBLICATIONS

Intel Corporation: "Analysis of Anchored and Non-Anchored D2D Aided Positioning", 3GPP TSG RAN WG1 Meeting #82, 3GPP Draft, R1-153991 Intel—D2D Trilateration, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), pp. 1-6, XP051001398, Retrieved from the Internet: URL: http://www.3gpp.org/ftp/Meetings_3GPP_SYNC/RAN1/Docs/ [Retrieved on Aug. 23, 2015] The Whole Document, p. 1-p. 4.

(Continued)

*Primary Examiner* — Zewdu A Beyen
(74) *Attorney, Agent, or Firm* — Thien T. Nguyen

(57) ABSTRACT

The position of a target user equipment (UE) is determined using an anchor UE and sidelink communication signals transmitted from the target UE to the anchor UE. During a positioning session, the anchor UE receives from the target UE sidelink communication signals, such as data signals and/or data related reference signals. The anchor UE performs positioning measurements for the sidelink communication signals from the target UE, such as timing based, angle based, or power based measurements. The anchor UE provides the positioning measurements of the sidelink communication signals to a location server, which may use the positioning measurements, along with a known position of the anchor UE to determine the position of the target UE.

26 Claims, 7 Drawing Sheets

(56) References Cited

OTHER PUBLICATIONS

International Search Report and Written Opinion—PCT/US2021/056914—ISA/EPO—dated Feb. 23, 2022.

\* cited by examiner

SIDELINK ASSISTED POSITIONING

BACKGROUND

Field

The subject matter disclosed herein relates to wireless communications systems, and more particularly to systems, methods, and devices that support positioning using sidelink signals.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. Additionally, sidelink reference signals may be transmitted by UEs and positioning measurements performed by a UE. The UE may compute an estimate of its own location using the positioning measurements in UE-based positioning or may send the positioning measurements to a network entity, e.g., location server, which may compute the UE location based on the positioning measurements in UE-assisted positioning.

It may be desirable for positioning improvements implemented in newer technologies, such as 5G NR, to be available in legacy technologies, such as LTE.

SUMMARY

The position of a target user equipment (UE) that is not capable of sidelink based positioning is determined using an anchor UE and sidelink communication signals transmitted from the target UE to the anchor UE. The target UE is capable of sidelink communications, but cannot send positioning reference signals using sidelink transmissions. During a positioning session, the target UE may receive sidelink communication resource scheduling from the network or a request for data from the anchor UE and, in response, may transmit sidelink communication signals. The anchor UE receives the sidelink communication signals and performs positioning measurements, such as timing based, angle based, or power based measurements. The anchor UE provides the positioning measurements of the sidelink communication signals to a location server, which may use the positioning measurements, along with a known position of the anchor UE to determine the position of the target UE.

In one implementation, a method by an anchor user equipment (UE) for supporting positioning of a target UE, includes receiving a sidelink communication signal from the target UE, wherein the sidelink communication signal is one of a data signal, a data related reference signal, or a combination thereof; performing a positioning measurement for the sidelink communication signal from the target UE; and sending the positioning measurement for the sidelink communication signal to a location server for positioning of the target UE.

In one implementation, an anchor user equipment (UE) configured to support positioning of a target UE, includes a wireless transceiver configured to wirelessly communicate with entities in the wireless network; at least one memory; and at least one processor coupled to the wireless transceiver and the at least one memory, wherein the at least one processor is configured to: receive a sidelink communication signal from the target UE, wherein the sidelink communication signal is one of a data signal, a data related reference signal, or a combination thereof; perform a positioning measurement for the sidelink communication signal from the target UE; and send the positioning measurement for the sidelink communication signal to a location server for positioning of the target UE.

In one implementation, an anchor user equipment (UE) configured to support positioning of a target UE, includes means for receiving a sidelink communication signal from the target UE, wherein the sidelink communication signal is one of a data signal, a data related reference signal, or a combination thereof; means for performing a positioning measurement for the sidelink communication signal from the target UE; and means for sending the positioning measurement for the sidelink communication signal to a location server for positioning of the target UE.

In one implementation, a non-transitory storage medium including program code stored thereon, the program code is operable to configure at least one processor in an anchor user equipment (UE) to support positioning of a target UE, includes program code to receive a sidelink communication signal from the target UE, wherein the sidelink communication signal is one of a data signal, a data related reference signal, or a combination thereof; program code to perform a positioning measurement for the sidelink communication signal from the target UE; and program code to send the positioning measurement for the sidelink communication signal to a location server for positioning of the target UE.

In one implementation, a method by a location server for supporting positioning of a target user equipment (UE), includes receiving from one or more base stations uplink positioning measurements for positioning reference signals transmitted by the target UE and measured by the one or more base stations; receiving from an anchor UE a positioning measurement for a sidelink communication signal transmitted by the target UE to the anchor UE; and determining a position of the target UE based on the uplink positioning measurements from the one or more base stations and the positioning measurement from the anchor UE.

In one implementation, a location server configured to support positioning of a target user equipment (UE), includes an external interface configured to communicate with entities in the wireless network; at least one memory; and at least one processor coupled to the external interface and the at least one memory, wherein the at least one processor is configured to: receive from one or more base stations uplink positioning measurements for positioning reference signals transmitted by the target UE and measured by the one or more base stations; receive from an anchor UE a positioning measurement for a sidelink communication signal transmitted by the target UE to the anchor UE; and determine a position of the target UE based on the uplink positioning measurements from the one or more base stations and the positioning measurement from the anchor UE.

In one implementation, a location server configured to support positioning of a target user equipment (UE), includes means for receiving from one or more base stations uplink positioning measurements for positioning reference signals transmitted by the target UE and measured by the one or more base stations; means for receiving from an anchor UE a positioning measurement for a sidelink communication signal transmitted by the target UE to the anchor UE; and means for determining a position of the target UE based on the uplink positioning measurements from the one or more base stations and the positioning measurement from the anchor UE.

In one implementation, a non-transitory storage medium including program code stored thereon, the program code is operable to configure at least one processor in a location server to support positioning of a target user equipment (UE), includes program code to receive from one or more base stations uplink positioning measurements for positioning reference signals transmitted by the target UE and measured by the one or more base stations; program code to receive from an anchor UE a positioning measurement for a sidelink communication signal transmitted by the target UE to the anchor UE; and program code to determine a position of the target UE based on the uplink positioning measurements from the one or more base stations and the positioning measurement from the anchor UE.

Figure 1:
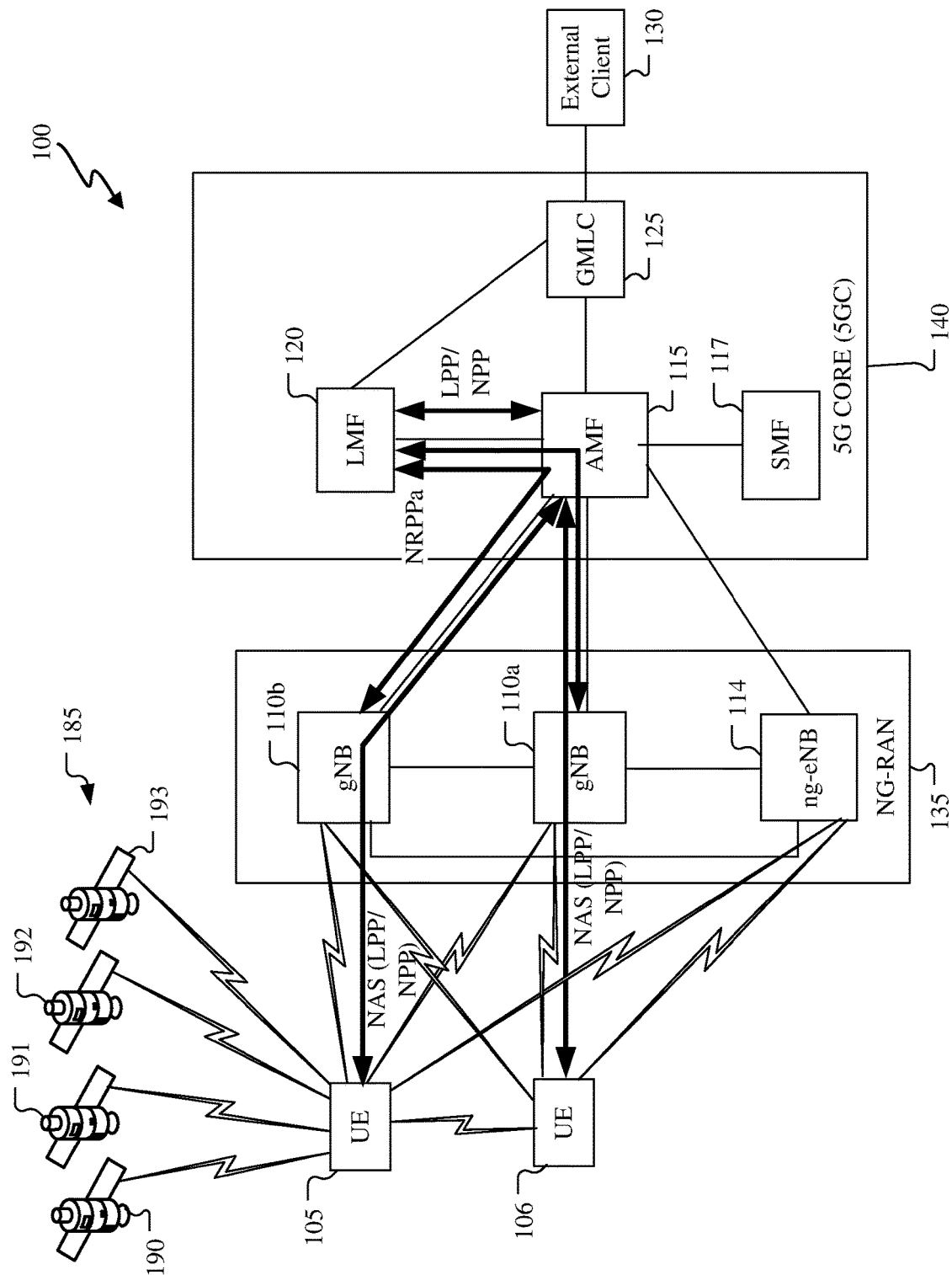
FIG. 1 shows an architecture of communication system including a target UE, an anchor UE, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Techniques are discussed herein for using a user equipment (an anchor UE) for signal exchange with another user equipment (a target UE) for positioning. The anchor UE may serve as an anchor point for positioning with the target UE, e.g., to receive signals from the target UE for measurement with which a location of the target UE may be determined. The target UE, for example, may be a legacy device and not capable of performing sidelink based positioning, while the anchor UE is capable of sidelink based positioning. During a positioning session, the target UE transmits sidelink communication signals to an anchor UE in response to sidelink communication resource scheduling received from the network or a request for data received from the anchor UE. The sidelink communication signals, for example, may be one of a data signal, a data related reference signal, or a combination thereof, but do not include positioning related signals, such as downlink positioning reference signals (DL-PRS) or sounding reference signals for positioning (SRSPos). The anchor UE performs, e.g., timing based, angle based, or power based positioning measurements for the sidelink communication signals and provides the positioning measurements to a location server, which may use the positioning measurements, along with a known position of the anchor UE to determine the position of the target UE.

Items and/or techniques described herein may provide one or more of the following capabilities, as well as other capabilities not mentioned. Positioning of a target UE may be achieved in the absence of sufficient base stations for positioning of the target UE. Positioning accuracy of a target UE may be improved. Communication from a target UE may be improved, e.g., by using an anchor UE as a communication relay. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1 shows an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105 and UE 106, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UEs 105 and 106 via multiple carriers. Each of the BSs 110a, 110b, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only UEs 105 and 106 are illustrated, many UEs (e.g., hundreds, thousands, millions, etc.) may be utilized in the communication system 100.

Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105, 106) or at BSs 110a, 110b, 114 and/or provide location assistance to the UEs 105, 106 (via the GMLC 125 or other location server) and/or compute a location for the UEs 105, 106 at a location-capable device such as the UEs 105, 106, the BSs 110a, 110b, or the LMF 120 based on measurement quantities received at the UEs 105, 106 or the BSs 110a, 110b, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105, 106 may include multiple UEs and may be a mobile wireless communication device, but may communicate wirelessly and via wired connections. The UEs 105, 106 may be any of a variety of devices, e.g., a smartphone, a tablet computer, a vehicle-based device, etc., but these are examples only as the UEs 105, 106 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UEs 105, 106, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UEs 105, 106 (e.g., via the GMLC 125).

The UEs 105, 106 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UEs 105, 106 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105, 106 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105, 106 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UEs 105, 106 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105, 106 to communicate with the external client 130 (e.g., via elements of the 5GC 140 not shown in FIG. 1, or possibly via the GMLC 125) and/or allow the external client 130 to receive location information regarding the UEs 105, 106 (e.g., via the GMLC 125).

Each of the UEs 105, 106 may include a single entity or may include multiple entities such as in a personal area network where a user may employ audio, video and/or data I/O (input/output) devices and/or body sensors and a separate wireline or wireless modem. An estimate of a location of a UE, e.g., UE 105 or UE 106, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UEs 105, 106 may be configured to communicate with other entities using one or more of a variety of technologies. The UEs 105, 106 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UEs 105, 106 via wireless communication between the UEs and one or more of the gNBs 110a, 110b, which may provide wireless communications access to the 5GC 140 on behalf of the UE using 5G. In FIG. 1, the serving gNB for the UE is assumed to be the gNB 110b, while the serving gNB for the UE 106 is assumed to be the gNB 110a, although another gNB may act as a serving gNB if the UEs 105, 106 move to another location or may act as a secondary gNB to provide additional throughput and bandwidth to the UEs 105, 106 and the UEs 105, 106 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UEs 105, 106. One or more of the gNBs 110a, 110b and/or the ng-eNB 114 may be configured to function as positioning-only beacons which may transmit signals to assist with determining the position of the UEs 105, 106 but may not receive signals from the UEs 105, 106 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs 105 and 106. The UEs may be dispersed throughout the wireless communications system 100, and each UE may be stationary or mobile. As part of the communication, each of the base stations 110a, 110b, 114 and UEs 105 and 106 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE 105, 106 to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UEs 105 and 106 may be configured to transmit uplink signals to one or more base stations 110a, 110b, 114 and sidelink transmissions between UEs 105 and 106.

The base stations 110a, 110b, 114 may transmit one or more additional downlink reference signals, including a positioning reference signal (PRS) transmission. The PRS transmission may be configured for a specific UE 105, 106, UE 106 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105, 106 (such as global positioning system (GPS) technology).

A base station 110*a*, 110*b*, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110*a*, 110*b*, 114. The structure of the one or more PRS resources, PRS resource sets, and PRS resource settings within a PRS transmission may be referred to as a multi-level resource setting. For example, multi-level PRS resource setting of the base station 110*a*, 110*b*, 114 may include multiple PRS resource sets and each PRS resource set may contain a set of PRS resources (such as a set of 4 PRS resources).

The UEs 105, 106 may receive the PRS transmission over the one or more PRS resources of the slot. The UEs 105, 106 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105, 106 may be configured to transmit one or more additional uplink reference signals that may be received by base stations 110*a*, 110*b*, 114 and used for positioning. For example, UEs 105 may transmit sounding reference signal (SRS) for positioning. Base stations 110*a*, 110*b*, 114 that receive uplink reference signals from a UEs 105, 106 may perform positioning measurements, such as one or more of a time of arrival (TOA), reception to transmission difference (UE Rx-Tx).

Aspects of wireless communications system 100 may include use of downlink PRS transmissions by the base station 110*a*, 110*b*, 114 or uplink SRS transmissions by a UE, e.g., UE 105 or UE 106, for UE location determination. For downlink-based UE location determination, a location server 164/196, e.g., LMF in a NR network, or E-SMLC in LTE (sometimes referred to as location server 164/196), may be used to provide positioning assistance, such as PRS assistance data (AD) to the UE. In UE-assisted positioning, the location server may receive measurement reports from the UE that indicates position measurements for one or multiple base stations 110*a*, 110*b*, 114 with which location server may determine a position estimate for the UE, e.g., using TDOA, or other desired techniques. The location server 164/196 is illustrated in FIG. 1 as being located in the core networks 160/190, but may be external to the core networks 160/190, e.g., in an NG-RAN.

A position estimation of the UE may be determined using reference signals, such as PRS signals or SRS for positioning signals, or other reference signals, from one or more base stations 110*a*, 110*b*, 114 or the UE. Positioning methods, such as Observed Time Difference of Arrival (OTDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used in which UEs transmit and/or receive sidelink positioning reference signals that are measured and used for positioning. Older standards, however, do not support sidelink based positioning, and accordingly, some UEs may not be capable of transmitting, receiving, or measuring sidelink positioning reference signals.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, 106, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UEs 105, 106, including cell change and handover and may participate in supporting a signaling connection to the UEs 105, 106 and possibly data and voice bearers for the UEs 105, 106. The LMF 120 may communicate directly with the UEs 105, 106, e.g., through wireless communications, or directly with the BSs 110*a*, 110*b*, 114. The LMF 120 may support positioning of the UEs 105, 106 when the UEs 105, 106 accesses the NG-RAN 135 and may support position procedures/methods such as Assisted GNSS (A-GNSS), Observed Time Difference of Arrival (OTDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, 106, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105, 106 and the core network 140, and provides QoS (Quality of Service) flow and session management. The AMF 115 may support mobility of the UEs 105, 106 including cell change and handover and may participate in supporting signaling connection to the UEs 105, 106.

The GMLC 125 may support a location request for the UEs 105, 106 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105, 106) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UEs 105, 106 may communicate using an LTE Positioning Protocol (LPP), which may be defined in 3GPP TS 36.355. The LMF 120 and the UEs 105, 106 may also or instead communicate using a New Radio Positioning Protocol (which may be referred to as NPP or NRPP), which may be the same as, similar to, or an extension of LPP. Here, LPP and/or NPP messages may be transferred between the UEs 105, 106 and the LMF 120 via the AMF 115 and the serving gNB 110a, 110b or the serving ng-eNB 114 for the UEs 105, 106. For example, LPP and/or NPP messages may be transferred between the LMF 120 and the AMF 115 using a 5G Location Services Application Protocol (LCS AP) and may be transferred between the AMF 115 and the UEs 105, 106 using a 5G Non-Access Stratum (NAS) protocol. Communication between the LMF 120 and UEs 105, 106 using LPP protocol, may sometimes referred to herein as direct communication, as the messages are transparent to the serving gNB, i.e., the serving gNB does not need to understand the content of the message, but simply forwards the communication between the LMF 120 and UEs 105,106. In contrast, during communications using NPP protocol, such as NRPPa, the serving gNB unpacks the message, picks out the content, which is packed and sent to UE, e.g., in a Uu air interface via Radio Resource Control (RRC), Medium Access Control—Control Element (MAC-CE), Downlink Control Information (DCI), etc. The LPP and/or NPP protocol may be used to support positioning of the UEs 105, 106 using UE-assisted and/or UE-based position methods such as A-GNSS, RTK, TDOA, AOA, AOD, and/or E-CID. The NRPPa protocol may be used to support positioning of the UEs 105, 106 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105 or UE 106 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105 or UE 106, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), sidelink UEs, or APs may obtain location measurements (e.g., measurements of RSSI, RTT, RSRP, RSRQ, AOA, AOD, or Time Of Arrival (ToA) for signals transmitted by the UE, e.g., UE 105 or UE 106) and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UEs 105, 106 as assistance data in an LPP and/or NPP message via the NG-RAN 135 and the 5GC 140.

An LPP or NPP message sent from the LMF 120 to the UEs 105, 106 may instruct the UEs 105, 106 to do any of a variety of things depending on desired functionality. For example, the LPP or NPP message could contain an instruction for the UEs 105, 106 to obtain measurements for GNSS (or A-GNSS), WLAN, E-CID, and/or OTDOA (or some other position method). In the case of E-CID, the LPP or NPP message may instruct the UEs 105, 106 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UEs 105, 106 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105, 106 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UEs 105, 106 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UEs 105, 106. In these other embodiments, positioning of the UEs 105, 106 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

The UEs 105 and 106 may have different positioning capabilities. For example, UEs 105 and 106 may support positioning pursuant to different 3GPP standards. The UE 105, for example, may support positioning according to a current (or future) standard, e.g., Release 17 for 3GPP, while UE 106 may only support positioning according to a relatively older standard, e.g., Release 16 for 3GPP. Because UE 106 supports positioning pursuant to an older standard than UE 105, UE 106 may sometimes be referred to herein as the "legacy device." In one implementation, UE 105 is capable of sidelink based positioning, e.g., sending and/or receiving and measuring reference signals for positioning to and from other UEs using sidelink transmissions, which may be enabled by the positioning standards supported by UE 105, as agreed upon for Release 17, while legacy device UE 106 is not capable of sidelink based positioning as UE 106 only supports an older positioning standard, e.g., Release 16, that does not enable sidelink based positioning. While the legacy device UE 106 is not capable of performing sidelink based positioning, e.g., sending and/or receiving and measuring sidelink positioning reference signals with UE 105, the legacy device UE 106 is capable of sidelink communications with UE 105.

It may be desirable, however, to use of one or more sidelink channels for positioning, even with legacy devices, such as UE 106. Accordingly, as discussed herein, positioning of a target UE, which may be a legacy device, may be performed based on non-positioning related sidelink communications, e.g., referred to herein as sidelink communication signals. The target UE need not know that its sidelink data transmissions are for positioning, but the sidelink data transmissions may be used by an anchor UE (capable of sidelink positioning) for positioning measurements and/or sidelink communications.

Accordingly, as discussed herein, the target UE 106 may not be capable of measuring positioning-related information via sidelink communications, but UE 105 with which the target UE 106 may have a sidelink connection, may be capable of supporting sidelink positioning, and if the position of the UE 105 is known, may serve as an anchor for the target 106. The target UE 106 may transmit sidelink communication signals that are received and measured by the anchor UE 105, e.g., in a uplink-like sidelink positioning scheme. The sidelink communication signals transmitted by the target UE 106 that is received and measured by the anchor UE 105 may be, e.g., any data signals or data related reference signals, such as Physical Sidelink Control Channel (PSCCH) signals, Physical Sidelink Shared Channel (PSSCH) signals, Physical Sidelink Broadcast Channel (PSBCH) signals, Sidelink Channel State Information Reference Signals (SL-CSIRS), Physical Sidelink Feedback Channel (PSFCH), or Sidelink Sounding Reference Signals (SL-SRS), and does not include positioning related signals, such as DL-PRS or SRS for positioning (SRSPos). The sidelink communication signals transmitted by the target UE 106 are enabled by the relatively older standard supported by the target UE 106, e.g., Release 16, and does not include positioning signals, such as sidelink positioning reference signals or sidelink sounding reference signals for positioning. The target UE 106 does not need to know that the sidelink communication signals that are transmitted to the anchor UE 105 will be measured by the anchor UE 105 and used for positioning for the target UE 106. For example, the target UE 106 may transmit the sidelink communication signals to the anchor UE 105 in response to a request for sidelink data from the anchor UE 105 or sidelink scheduling received from a serving base station.

The anchor UE 105 may receive the sidelink communication signals from the target UE 106 and perform positioning measurements for the sidelink communication signals. For example, the anchor UE 105 may perform timing related measurements, such as TOA, Rx-Tx, or RTT, or may perform angle related measurements, e.g., AOA, or may perform power related measurements, such as RSRP, or any other desired positioning measurement. By way of example, the anchor UE 105 may determines the AOA of the sidelink communication signals from the target UE 106 by processing the signal impinging on an antenna array of the anchor UE 105. The AOA of the sidelink communication signals relative to the antenna array of the anchor UE 105 may be converted to a local or global reference frame based on a known orientation of the anchor UE 105, e.g., based on inertial sensors (magnetometers, accelerometers, etc.) in a movable anchor UE 105 or a known orientation in a stationary anchor UE 105.

The anchor UE 105 may provide a report of the positioning measurement to a location server, e.g., the LMF 120. The report, for example, the report may include the identity of the target UE 106, the identity of the anchor UE 105, the type of positioning measurement performed and the positioning measurement, such as AoA, RSRP, TOA, Rx-Tx time difference etc. The anchor UE 105 may send the measurement report to the location server, e.g., LMF 120, via the base station 110a that is serving the anchor UE 105, which may be the same base station or a different base station than is serving the target UE 106. The report may be sent to the location server, e.g., LMF 120, by the anchor UE 105 using LPP, or using NRPPa, e.g., where the anchor UE 105 emulates a base station.

The anchor UE 105 may be able to emulate a base station, e.g., exchanging signals with a location server (LMF 120) similarly to how a base station would exchange signals (e.g., using a protocol that a base station would use, providing information (e.g., base station ID (identity)), etc.). The anchor UE 105, for example, may be assigned one or more IDs, such as a TRP ID or cell ID, by the LMF 120 with which the anchor UE 105 may emulate a TRP (in a transparent or base-station mode).

Figure 2:
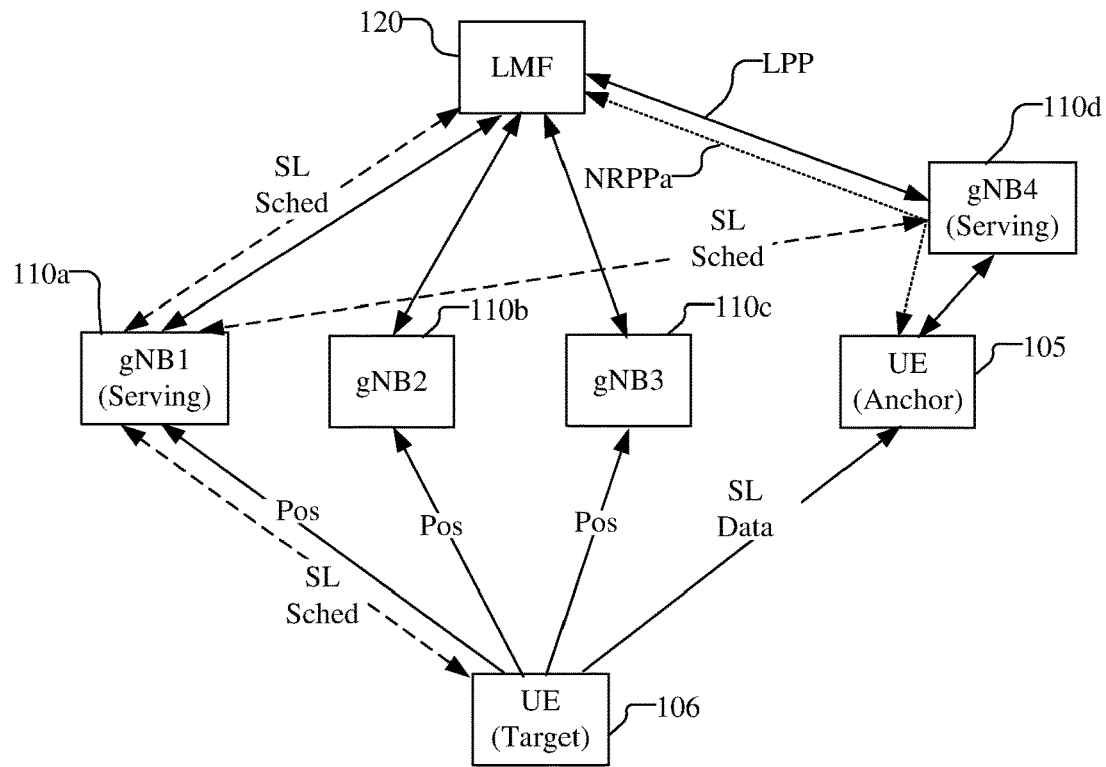
FIGS. 2 and 3 illustrate examples of wireless communications systems in which a position of the target UE is determined using uplink positioning reference signals transmitted to a number of base stations and a sidelink communication signal transmitted to the anchor UE.
Figure 3:
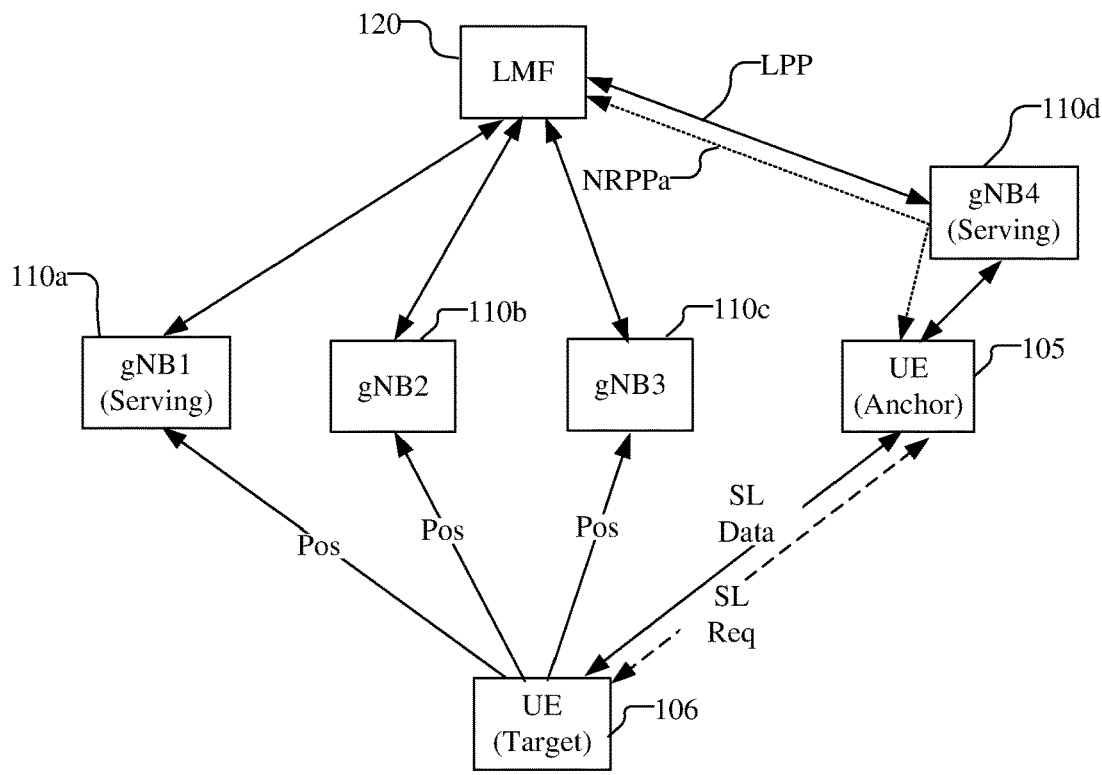

FIGS. 2 and 3 illustrate examples of wireless communications systems 200 and 300, respectively, in which a position of the target UE 106 is determined using uplink positioning reference signals transmitted to a number of base stations 110a, 110b, 110c (gNB1, gNB2, gNB3, respectively) and a sidelink communication signal transmitted to the anchor UE 105. FIG. 2 illustrates a mode in which the serving base station 110a (gNB1) for the target UE 106 schedules the sidelink traffic, while FIG. 3 illustrates a mode in which the UEs 105 and 106 schedule the sidelink traffic. As illustrated, the target UE 106 communicates with a location server (LMF 120) via the serving base station 110a, while the anchor UE 105 communicates with the location server (LMF 120) via a separate serving base station 110d (gNB4), but if desired, anchor UE 105 may communicate to the LMF 120 via the serving base station 110a for the target UE 106. Moreover, while FIGS. 2 and 3 illustrate a single anchor UE 105, it should be understood that a plurality of anchor UEs may be used if desired.

During a positioning session, the anchor UE 105 may first confirm with the LMF 120 that the anchor UE 105 supports the anchor UE mode, i.e., supports sidelink positioning and may serve as an anchor for a target UE. The LMF 120 may send the configuration for the uplink positioning reference signals, e.g., SRS for positioning, that will be transmitted by the target UE 106 to the anchor base stations 110a, 110b, 110c and may instruct the anchor base stations 110a, 110b, 110c to measure the uplink positioning reference signals. As illustrated, the target UE 106 transmits uplink positioning reference signals (Pos) to the base stations 110a, 110b, and 110c. Each of the base stations 110a, 110b, and 110c may measure the uplink positioning reference signals (Pos) transmitted by the target UE 106 and report the positioning measurements to the LMF 120.

As discussed above, the target UE 106 may not be capable of sidelink positioning and, thus, cannot transmit sidelink positioning reference signals to the anchor UE 105 in a sidelink channel, e.g., if the target UE 106 is a legacy device. The target UE 106, however, may be capable of transmitting sidelink communication signals (SL Data) to the anchor UE 105, with which the anchor UE 105 may perform positioning measurements.

In one mode, illustrated in FIG. 2, the target UE 106 may be configured to transmit the sidelink communication signals (SL Data) in response to a sidelink schedule (SL Sched) received from the serving base station 110a. For example, as illustrated in FIG. 2, the LMF 120 may provide the sidelink schedule (SL Sched) to the serving base station 110a or may provide other information or instructions with which the serving base station 110a may generate the sidelink schedule for the target UE 106. In another implementation, the anchor UE 105 or the serving base station 110d may provide information or a request to the serving base station 110a and in response the serving base station 110a may generate the sidelink schedule for the target UE 106. The serving base station 110a provides the sidelink schedule (SL Sched) to the target UE 106, as illustrated in FIG. 2. In some implementations, the serving base station 110a may provide the sidelink schedule (SL Sched) to the anchor UE 105 as well (e.g., via the serving base station 110d so that the anchor UE 105 is prepared to receive and measure the sidelink data (SL Data) that is transmitted by the target UE 106 pursuant to the sidelink schedule (SL Sched).

In another mode, illustrated in FIG. 3, the target UE 106 may be configured to transmit the sidelink communication signals (SL Data) in response to a request (SL Req) from the anchor UE 105. The anchor UE 105, for example, may not be entitled to schedule sidelink traffic for other UEs. The anchor UE 105, however, may send a sidelink request (SL Req) for data to the target UE 106 and the target UE 106 may transmit the requested data in response. In some implementations, the LMF 120 may instruct the anchor UE 105 to send the sidelink request (SL Req) to the target UE 106 and in response the anchor UE 105 may send the sidelink request for data to the target UE 106 with which the anchor UE 105 may perform positioning measurements.

The target UE 106 transmits the sidelink data (SL Data) to the anchor UE 105, e.g., pursuant to the sidelink schedule (SL Sched) (FIG. 2) or the sidelink request (SL Req) (FIG. 3). The anchor UE 105 receives the sidelink communication signals (SL Data) and perform positioning measurements requested by the LMF 120, such as timing, angle, or power related measurements, such as TOA, AOA or RSRP. The anchor UE 105 may report of the positioning measurement to the LMF 120, e.g., via the serving base station 110d, e.g., using LPP or using NRPPa protocols as illustrated.

The positioning session for the target UE 106 may be initiated before or after sidelink communications have been established between the target UE 106 and anchor UE 105. For example, in the mode in which the serving base station 110a schedules the sidelink traffic, illustrated in FIG. 2, the target UE 106 (or an external client) may send a request to the LMF 120 for positioning for the target UE 106. If the sidelink communications between the target UE 106 and anchor UE 105 are not already established, the sidelink connection may be initiated by the network, e.g., LMF 120. All communications between the LMF 120 and the target UE 106 may be through the serving base station 110a for the target UE 106 and all communications between the LMF 120 and the anchor UE 105 may be through the serving base station 110d for the anchor UE 105. The LMF 120, for example, may send a request, via the serving base station 110a, to the target UE 106 to search for and associate, i.e., establish sidelink connections, with other UEs. The LMF 120 may request that the target UE 106 establish a sidelink connection with particular anchor UEs, such as anchor UE 105. The LMF 120 may additionally send a request, via serving base station 110d, to the anchor UE 105 to wait for the connection from target UE 106. In another implementation, the LMF 120 may send a request, via the serving base station 110d, to the anchor UE 105 to search for and establish a sidelink connection with the target UE 106, and may request, via the serving base station 110a, that the target UE 106 wait for the connection from the anchor UE 105. Once the sidelink connection is established, the target UE 106 may receive the sidelink schedule (SL Sched) and transmit the sidelink data to the anchor UE 105 accordingly.

If the sidelink connection between the target UE 106 and anchor UE 105 is already established, e.g., before the positioning session is initiated, the target UE 106 and anchor UE 105 pair will wait for sidelink scheduling from the network side, e.g., from the LMF 120 and serving base stations 110a. The anchor UE 105 may send a sidelink resource request to the network, e.g., LMF 120 or serving base station 110a. In addition, or alternatively, the target UE 106 may send an on-demand PRS request to the network, e.g., LMF 120, such as an on-demand PRS request for UL PRS or DL and UL PRS, e.g., for RTT. In response, the network, e.g., the LMF 120 or serving base station 110a, may schedule the sidelink data for transmission to the anchor UE 105 and ignore or reject the on-demand PRS request from the target UE 106, but send the sidelink schedule (SL Sched) to the target UE 106 and optionally the anchor UE 105. Thus, because the target UE 106 is legacy device and is not capable of sidelink positioning, the on-demand PRS request from the target UE 106 may be rejected/ignored, and, in response, the sidelink schedule for sidelink communication signal transmission is provided.

Additionally, in the mode in which the UEs 105, 106 schedule the sidelink traffic, as shown in FIG. 3, the positioning session for the target UE 106 also may be initiated before or after sidelink communications have been established between the target UE 106 and anchor UE 105. If the sidelink communications between the target UE 106 and anchor UE 105 are not already established, the sidelink connection may be initiated by anchor UE 105, e.g., at the request of network (LMF 120 or serving base station 110a for the target UE 106. For example, the serving base station 110a or LMF 120 may send a request to the anchor UE 105 to establish a legacy sidelink connection with the target UE 106. The anchor UE 105 may initiate the sidelink connection with the target UE 106, which may include the sidelink request (SL Req). If the sidelink connection is already established, the anchor UE 105 may send the sidelink request (SL Req) to the target UE 106 and request the sidelink communication signal transmission through the legacy sidelink connections.

Figure 4:
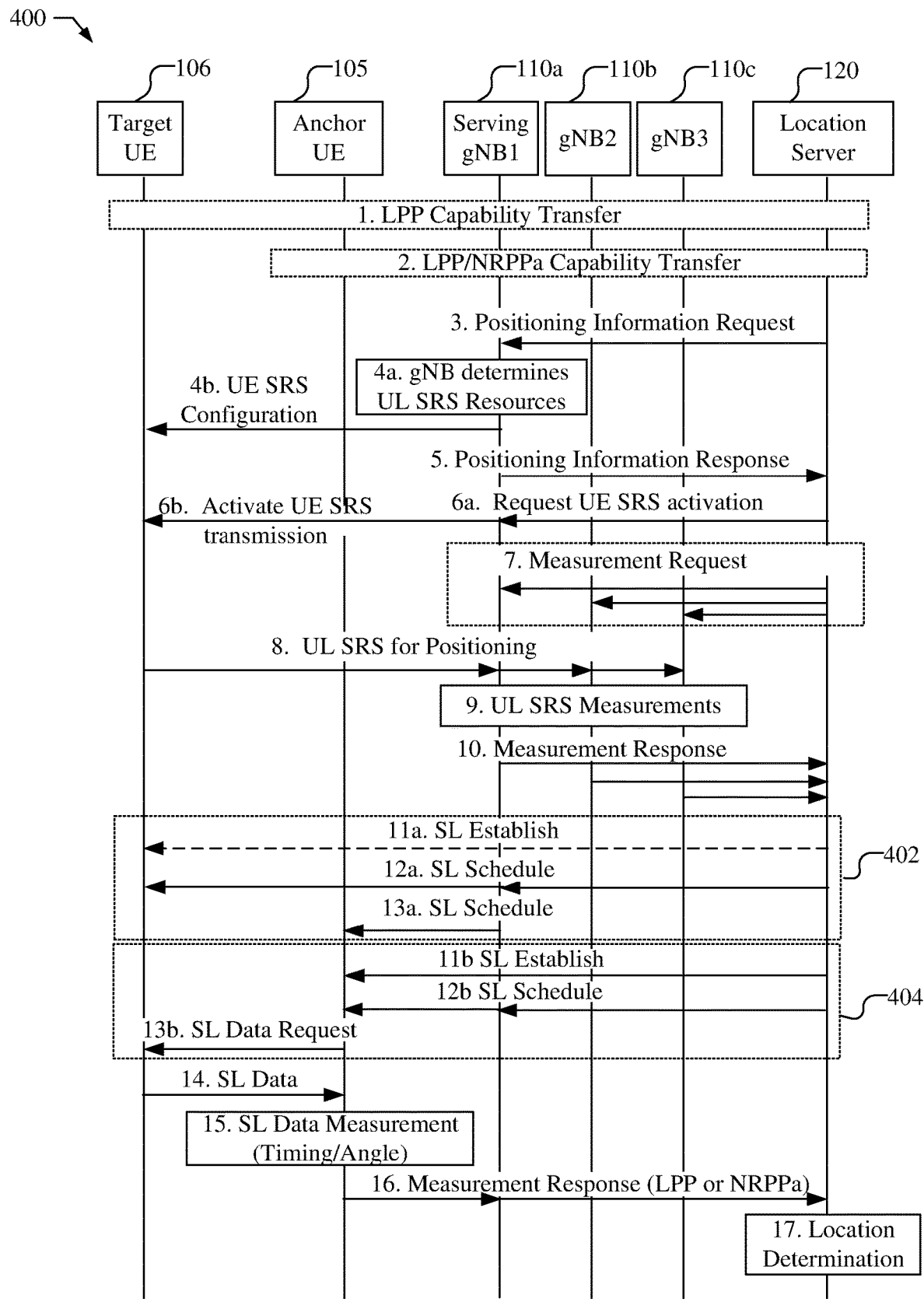
FIG. 4 is a signaling flow that illustrates various messages sent between components of a communication system 100 during a location session based at least partially on sidelink positioning of a target UE that is not enabled for sidelink positioning.

FIG. 4 is a signaling flow 1400 that illustrates various messages sent between components of the communication system 100 depicted in FIG. 1, during a location session based at least partially on sidelink positioning of a target UE 106 that is not enabled for sidelink positioning. A location server may be, e.g., an LMF 120 for a 5G NR network. The target UE 106 may be configured to perform network based positioning, in which the UE 106 transmits UL positioning reference signals, e.g., SRS for positioning, to a number of base stations, e.g., serving gNB1 110a, gNB2 110b, and gNB3 110c (sometimes collectively referred to as gNBs 110 or base stations 110), which perform positioning measurements and provide the measurements to the location server 120. As discussed above, the target UE 106 is further configured to transmit sidelink communication signals to an anchor UE 105, which performs positioning measurements and provides the measurements to the location server 120. In the signaling flow 400, it is assumed that the UEs 105 and 106 and location server 120 communicate using the LPP positioning protocol referred to earlier, although use of NPP or a combination of LPP and NPP or other future protocol, such as NRPPa, is also possible.

At stage 1, the target UE 106 and the location server 120 perform a capability transfer, which may use LPP or NRPPa positioning protocols. For example, the location server 120 may send a request capabilities message to the target UE 106, e.g., to request the capabilities from the UE 106, and the target UE 106 returns a provide capabilities message to the location server 120, in which the target UE 106 may provide its capabilities to perform positioning. The target UE 106, for example, may indicate that it is not capable of performing sidelink positioning, for example, by indicating the positioning standard (release version) that target UE 106 supports, which does not enable sidelink positioning. The target UE 106 may further indicate whether it currently has a sidelink connection with another UE, e.g., anchor UE 105.

At stage 2, the anchor UE 105 and the location server 120 perform a capability transfer, which may use LPP or NRPPa positioning protocols. The location server 120 may identify UE 105 as a possible anchor for positioning the target UE 106, for example, based on an indication from the target UE 106 in stage 1 that the target UE 106 and anchor UE 105 currently have a sidelink connection. If the anchor UE 105 is not currently connected to the target UE 106, the location server 120 may identify UE 105 as a possible anchor for positioning the target UE 106 based on a determination that the anchor UE 105 is near the target UE 106, e.g., based on the cell ID of the serving base stations, a known position of the anchor UE 105, a pre-estimation of position of the target UE 106, etc. The location server 120 may send a request capabilities message to the anchor UE 105, e.g., to request the capabilities from the anchor UE 105, and the anchor UE 105 returns a provide capabilities message to the location server 120, in which the anchor UE 105 may provide its capabilities to perform positioning. The anchor UE 105, for example, may indicate that it is capable of performing sidelink positioning and/or is capable of measuring sidelink communication signals and may server as an anchor UE for positioning the target UE 106. For example, the anchor UE 105 may indicate the positioning standard (release version) that anchor UE 105 supports, which enables sidelink positioning. The anchor UE 105 may further indicate whether it is capable of emulating a base station for the target UE 106, and if so, the anchor UE 105, for example, may be assigned one or more IDs, such as a TRP ID or cell ID, by the location server 120 with which the anchor UE 105 may emulate a TRP (in a transparent or base-station mode), e.g., using NRPPa positioning protocol.

At stage 3, the location server 120 sends a positioning information request message to the serving gNB 110a to request UL information for the target UE 106. In some implementations, the positioning information request may be an NRPPa positioning information request.

At stage 4a, the serving gNB 110a determines the resources available for UL SRS signals and configures the UE 106 with a UL SRS configuration message at stage 4b. In some implementations, the SRS configuration message may include SRS signal information associated with one or more positioning SRS messages, including for example, information regarding frequency, bandwidth, channel, and/or resource blocks associated with the positioning SRS messages.

At stage 5, the serving gNB 110a provides the UL SRS configuration information to the location server 120 in a positioning information response message. In some implementations, the positioning information response message may be a NRPPa positioning information response message.

At stage 6a, the location server 120 sends a request to activate UL SRS message to the serving gNB 110a. At stage 6b, the serving gNB 110a activates the UE SRS transmission from the target UE 106.

At stage 7, the location server 120 provides the UL information to the selected gNBs 110 in a Measurement Request message. The Measurement Request message includes all information required to enable the gNBs to perform the UL measurements. If desired stage 7 may be performed before stage 6a.

At stage 8, the target UE 106 transmits UL positioning SRS messages to the one or more gNBs 110.

At stage 9, each gNB 110 measures the UL positioning SRS transmissions from the target UE 106.

At stage 10, the gNBs 110 transmit a measurement response to the location server 120. In some implementations, the measurement response may include the SRS measurements associated with the UL positioning SRS messages performed at stage 9.

Block 402 of FIG. 4 illustrates messages sent in a mode in which the network, e.g., location server 120 and/or serving gNB 110*a*, schedule the sidelink traffic during the positioning session.

As illustrated by stage 11*a* in block 402, for example, if a sidelink connection between the target UE 106 and the anchor UE 105 has not already been established, the location server 120 may send a request, via serving gNB 110*a*, to the target UE 106 to establish a sidelink connection with the anchor UE 105. In some implementations, the location server 120 may send a request to the anchor UE 105, e.g., via serving base station 110*a*, to wait for a sidelink connection from the target UE 106. The request to the anchor UE 105 may be sent, for example, using the LPP protocol, where the message is transparent to the serving base station 110*a* or may be sent using the NRPPa protocol, where the serving base station 110*a* unpacks the message, picks out the content, which is packed and sent to the anchor UE 105, e.g., in a Uu control message via RRC/MAC-CE/DCI. In some implementations, the location server 120 may send the request to establish a sidelink connection to the anchor UE 105, and may optionally instruct the target UE 106 to wait for a sidelink connection from the anchor UE 105.

At stage 12*a*, after the sidelink connection has been established in stage 11*a*, or if the sidelink connection already existed, the location server 120 and/or the serving gNB 110*a* may send sidelink communication resource scheduling to the target UE 106. In some implementations, the anchor UE may send a sidelink resource request to the location server and the location server 120 may request that the serving gNB 110*a* generate and send the sidelink communication resource scheduling to the target UE 106

At stage 13*a*, the serving gNB 110*a* may optionally send the sidelink communication resource scheduling to the anchor UE 105.

Block 404 of FIG. 4 illustrates messages sent in a mode in which the UEs schedule the sidelink traffic during the positioning session. It should be understood that if the messages of block 404 are sent, then the messages of block 402 may not be sent, and vice versa, if the messages of block 402 are sent, then the messages of block 404 may not be sent.

As illustrated by stage 11*b* in block 404, for example, if a sidelink connection between the target UE 106 and the anchor UE 105 has not already been established, the location server 120 may send a request to the anchor UE 105, e.g., via serving base station 110*a* via NRPPa protocols, or directly to the anchor UE 105 via LPP protocols, to establish a sidelink connection with the target UE 106. In some implementations, the location server 120 may send a request, via the serving base station 110*a*, to the target UE 106 to wait for a sidelink connection from the anchor UE 105. In some implementations, the location server 120 may send the request to establish a sidelink connection to the target UE 106, via the serving base station 110*a*, and may optionally instruct the anchor UE 105, via serving base station 110*a* via NRPPa protocols, or directly to the anchor UE 105 via LPP protocols, to wait for a sidelink connection from the target UE 106.

At stage 12*b*, after the sidelink connection has been established in stage 11*b*, or if the sidelink connection already existed, the location server 120 and/or the serving gNB 110*a* may instruct the anchor UE 105 to send a sidelink data request to the target UE 106.

At stage 13*b*, the anchor UE 105 sends a request for sidelink data to the target UE 106.

At stage 14, the target UE 106 transmits sidelink communication signals to the anchor UE 105 pursuant to the sidelink communication resource scheduling received at stage 12*a* or the sidelink data request received at stag 13*b*. Because the target UE 106 is not capable of sidelink positioning, the sidelink communication signals transmitted at stage 14 by the target UE 106 are data signals and/or data related reference signals used for sidelink communications and are not signals specifically intended, e.g., designed, for positioning. By way of example, sidelink communication signals transmitted by the target UE 106 may be data or reference signals, such as PSCCH, PSSCH, PSBCH, SL-CSIRS, PSFCH, or SL-SRS.

At stage 15, the anchor UE 105 measures the sidelink communication signals transmitted by the target UE 106. For example, the anchor UE 105 may perform timing measurements, such as TOA, Rx-Tx, etc., or may perform angle based measurements, such as AOA, or power related measurements, such as RSRP, or any other desired positioning measurement.

At stage 16, the anchor UE 105 transmits a measurement response to the location server 120 that includes the positioning measurements obtained in stage 15 of the sidelink communication signals transmitted by the target UE 106. The measurement response, for example, may be transmitted using may use LPP or NRPPa positioning protocols.

At stage 17, the location server 120 determines the location of the target UE 106 based on the measurement responses received at stages 10 and 16, along with known positions of the gNBs 110 and a known position of the anchor UE 105, e.g., using trilateration, the intersection of multiple AoAs, etc.

Figure 5:
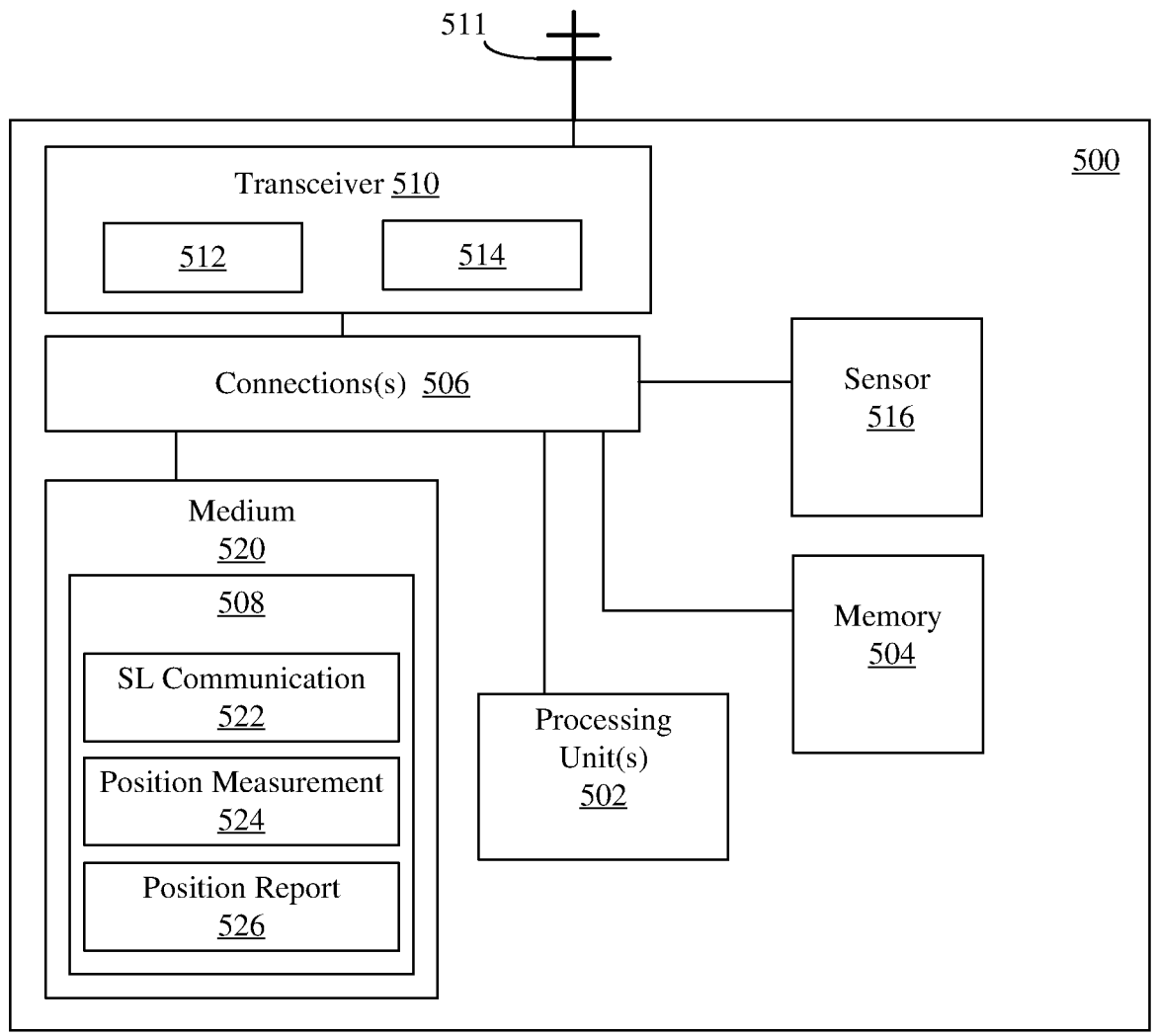
FIG. 5 shows a schematic block diagram illustrating certain exemplary features of a hardware implementation of an anchor UE.

FIG. 5 shows a schematic block diagram illustrating certain exemplary features of a hardware implementation of a UE 500, e.g., anchor UE 105, enabled to support positioning of a target UE, such as target UE 106, using sidelink positioning when the target UE 106 is not capable of sidelink positioning, in a manner consistent with disclosed implementation. The UE 500 includes, e.g., hardware components such as one or more processors 502, memory 504, a sensor unit 516, and a transceiver 510 (e.g., wireless network interface), which may be operatively coupled with one or more connections 506 (e.g., buses, lines, fibers, links, etc.) to non-transitory computer readable medium 520 and memory 504. The UE 500 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 500 may take the form of a chipset, and/or the like.

The transceiver 510 may, for example, include a transmitter 512 enabled to transmit one or more signals over one or more types of wireless communication networks and a receiver 514 to receive one or more signals transmitted over the one or more types of wireless communication networks. In some embodiments, UE 500 may include antenna 511, which may be internal or external. UE antenna 511 may be used to transmit and/or receive signals processed by transceiver 510. In some embodiments, UE antenna 511 may be coupled to transceiver 510. In some embodiments, measurements of signals received (transmitted) by UE 500 may be performed at the point of connection of the UE antenna 511 and transceiver 510. For example, the measurement point of reference for received (transmitted) RF signal measurements may be an input (output) terminal of the receiver 514 (transmitter 512) and an output (input) terminal of the UE antenna 511. In a UE 500 with an antenna 511 that includes multiple antennas or an antenna array, the antenna connector may be viewed as a virtual point representing the aggregate output (input) of multiple UE antennas. The phase difference of received signals at multiple antennas or antenna array may be used to the AoA of the signal with respect to the antenna array, which may be converted to a local or global reference frame based on a known orientation of the UE 500. In some embodiments, UE 500 may measure received signals including timing measurements, angle measurements, or signal strength measurements and the raw measurements may be processed by the one or more processors 502.

The sensor unit 516 may comprise, for example, one or more of various types of sensors such as one or more inertial sensors, one or more magnetometers, one or more environment sensors, one or more optical sensors, one or more weight sensors, and/or one or more radio frequency (RF) sensors, etc. For example, the sensor unit 516 may include one or more accelerometers (e.g., collectively responding to acceleration of the UE 500 in three dimensions) and/or one or more gyroscopes (e.g., three-dimensional gyroscope(s)), one or more magnetometers (e.g., three-dimensional magnetometer(s)) to determine orientation (e.g., relative to magnetic north and/or true north), one or more temperature sensors, one or more barometric pressure sensors, one or more ambient light sensors, one or more camera imagers, and/or one or more microphones, etc. The sensor unit 516 may generate analog and/or digital signals indications of which may be stored in the memory 504 and processed by the processing units 502 in support of one or more applications such as, for example, applications directed to positioning and/or navigation operations. The sensor unit 516 may be used in relative location measurements, relative location determination, motion determination, etc. Information detected by the sensor unit 516 may be used for motion detection, relative displacement, dead reckoning, sensor-based location determination, and/or sensor-assisted location determination. The sensor unit 516, for example, may be useful to determine the orientation of the anchor UE 500. The orientation of the UE 500 may be used to convert the AoA of sidelink communication signals received from the target UE 106 to a local or global reference frame.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include a sidelink communication unit 522 that that when implemented by the one or more processors 502 configures the one or more processors 502 to receive, via the transceiver 510, a sidelink communication signal from the target UE, such as PSSCH, PSBCH, PSCCH, SL-CSIRS, PSFCH, SL-SRS, or a combination thereof. The one or more processors 502 may be configured to establish a sidelink connection with the target UE, e.g., after receiving a request to establish a sidelink connection, or to wait for a sidelink connection from the target UE. The one or more processors 502 may further be configured to send, via the transceiver 510, a request for sidelink data to the target UE.

The medium 520 and/or memory 504 may include a position measurement unit 524 that when implemented by the one or more processors 502 configures the one or more processors 502 to perform a positioning measurement for the sidelink communication signal from the target UE, such as timing measurement such as TOA, Rx-Tx, RTT, etc., an angle measurement such as AoA, a power measurement such as RSRP, or a combination thereof. The one or more processors 502 may be configured to perform sidelink positioning. For example, the one or more processors 502 may be configured to send, via the transceiver 510, a sidelink resource request to the location server to obtain sidelink communication signals from the target UE with which positioning measurements may be performed. For example, the one or more processors 502 may be configured to send, via the transceiver 510, a request for sidelink data to the target UE to obtain sidelink communication signals from the target UE with which positioning measurements may be performed.

The medium 520 and/or memory 504 may include a position reporting unit 526 that when implemented by the one or more processors 502 configures the one or more processors 502 to send, via the transceiver, the positioning measurement for the sidelink communication signal to a location server for positioning of the target UE. The one or more processors 502 may be configured to send the position measurements to the location server using LPP or NRPPa positioning protocols and may emulate a base station, e.g., using assigned IDs, such as a TRP ID or cell ID.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program 508. For example, the non-transitory computer readable medium including program code 508 stored thereon may include program code 508 to support operation as an anchor UE using sidelink positioning for a target UE that is not capable of sidelink positioning in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable code 508 stored thereon, which if executed by at least one processors 502 may be operatively enabled to perform all or portions of the example operations as described herein. Computer readable medium 520 may be a part of memory 504.

Figure 6:
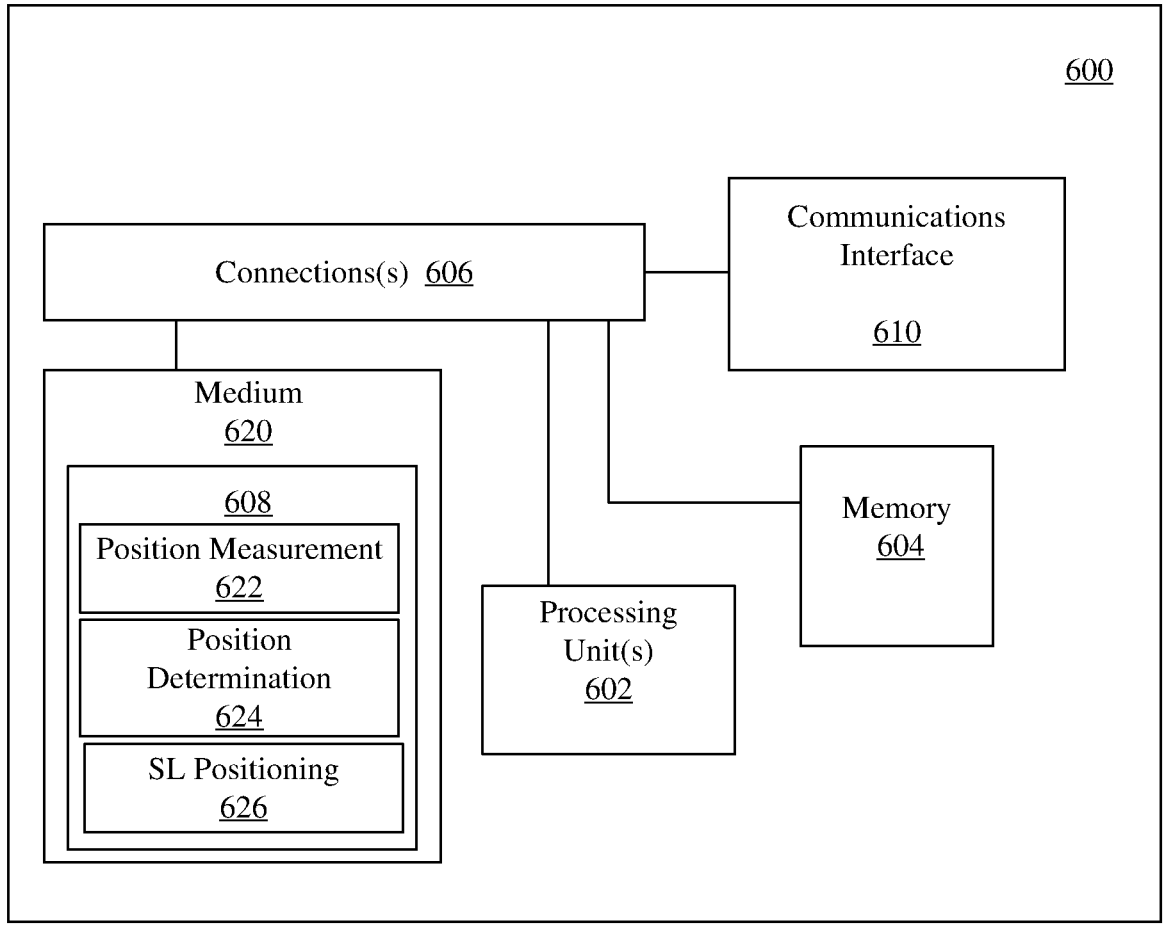
FIG. 6 shows a schematic block diagram illustrating certain exemplary features of a hardware implementation of a location server.

FIG. 6 is a schematic block diagram illustrating certain exemplary features of a hardware implementation of a location server 600, such as LMF 120, enabled to support positioning of a target UE, such as target UE 106, using sidelink positioning measurements from an anchor UE, such as anchor UE 105, when the target UE 106 is not capable of sidelink positioning, in a manner consistent with disclosed implementation. The location server 600 includes, e.g., hardware components such as one or more processors 602, memory 604, and a communications interface 610, which may be operatively coupled with one or more connections 606 (e.g., buses, lines, fibers, links, etc.) to non-transitory computer readable medium 620 and memory 604. The external interface 610 may be a wired and/or wireless interface capable of connecting to a transmission-reception point or a base station or, such as gNBs 110, via one or more intermediate entities, such as an AMF, and capable of communicating with UEs, such as a target UE 106 and an anchor UE 105.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a position measurement unit 622 that when implemented by the one or more processors 602 configures the one or more processors 602 to receive, via the external interface 610, from one or more base stations uplink positioning measurements for positioning reference signals transmitted by the target UE and measured by the one or more base stations. The one or more processors 602 may be further configured to receive, via the external interface 610, from an anchor UE a positioning measurement for sidelink data transmitted by the target UE to the anchor UE. The positioning measurement, for example, may be a timing measurement such as TOA, Rx-Tx, RTT, etc., an angle measurement such as AoA, a power measurement such as RSRP, or a combination thereof. The sidelink data, for example, may be, PSSCH, PSBCH, PSCCH, SL-CSIRS, PSFCH, SL-SRS, or a combination thereof.

The medium 620 and/or memory 604 may include a position determination unit 624 that when implemented by the one or more processors 602 configures the one or more processors 602 to determine a position of the target UE based on the uplink positioning measurements from the one or more base stations and the positioning measurement from the anchor UE. For example, the position measurements, along with known positions of the base stations and a known position of the anchor UE 105, may be used to determine the position of the target UE using trilateration, the intersection of multiple AoAs, or other known positioning techniques.

The medium 620 and/or memory 604 may include a sidelink positioning unit 626 that when implemented by the one or more processors 602 configures the one or more processors 602 to transmit, receive and coordinate sidelink positioning for a target UE that is not capable of sidelink positioning, using an anchor UE that is capable of sidelink positioning. For example, the one or more processors 602 may be configured to receive, via the external interface 610, from the anchor UE a sidelink resource request for sidelink data to be sent from the target UE to the anchor UE and to send, via the external interface 610, sidelink communication resource scheduling to the target UE through the serving base station. The one or more processors 602 may be further configured to send, via the external interface 610, a request via a serving base station to the target UE to establish a connection with the anchor UE or to the anchor UE to establish a connect with the target UE. The one or more processors 602 may be further configured to send, via the external interface 610, a request via a serving base station to the target UE or the anchor UE to wait for a sidelink connection from the anchor UE or the target UE, respectively.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support operation as an anchor UE using sidelink positioning for a target UE that is not capable of sidelink positioning in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 604, and are configured to cause the one or more processors to operate as a special purpose computer programmed to perform the procedures and techniques disclosed herein. That is, the communication apparatus includes transmission media with signals indicative of information to perform disclosed functions.

Figure 7:
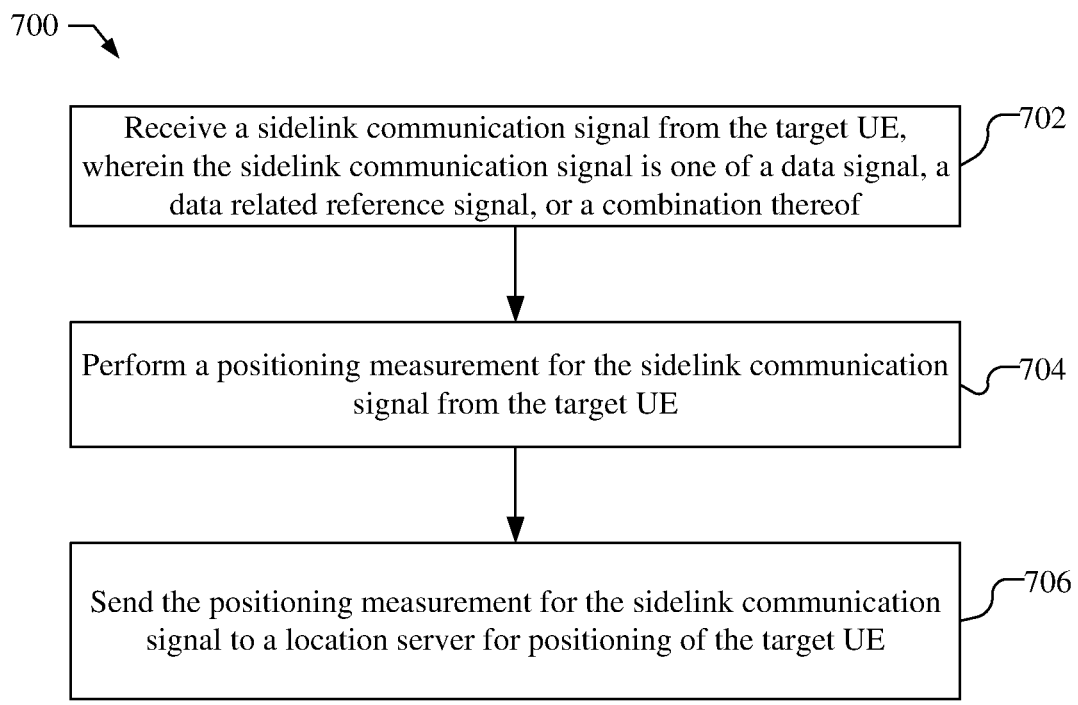
FIG. 7 shows a flowchart for an exemplary method to support positioning of a target UE.

FIG. 7 shows a flowchart for an exemplary method 700 performed by an anchor UE, such as anchor UE 105 to support positioning of a target user equipment (UE), e.g., such as target UE 106, in a manner consistent with disclosed implementation.

At block 702, the anchor UE may receive a sidelink communication signal from the target UE, wherein the sidelink communication signal is one of a data signal, a data related reference signal, or a combination thereof, e.g., as discussed at stage 14 of FIG. 4. The sidelink communication signal, for example, may be, physical sidelink synchronization channel (PSSCH), a physical sidelink broadcast channel (PSBCH), a physical sidelink control channel (PSCCH), sidelink channel state information reference signal (SL-CSIRS), a physical sidelink feedback channel (PSFCH), a sidelink sounding reference signals (SL-SRS), or a combination thereof. A means for receiving a sidelink communication signal from the target UE, wherein the sidelink communication signal is one of a data signal, a data related reference signal, or a combination thereof, may be, e.g., the wireless transceiver 510 and one or more processors 502 with dedicated hardware or implementing executable code or software instructions in memory 504 and/or medium 520 such as the sidelink communication unit 522.

At block 704, the anchor UE may perform a positioning measurement for the sidelink communication signal from the target UE, e.g., as discussed at stage 15 of FIG. 4. The positioning measurement, for example, may be a timing measurement such as TOA, Rx-Tx, RTT, etc., an angle measurement such as AoA, a power measurement such as RSRP, or a combination thereof. A means for performing a positioning measurement for the sidelink communication signal from the target UE may be, e.g., the one or more processors 502 with dedicated hardware or implementing executable code or software instructions in memory 504 and/or medium 520 such as the position measurement unit 524.

At block 706, the anchor UE may send the positioning measurement for the sidelink communication signal to a location server for positioning of the target UE, e.g., as discussed at stage 16 of FIG. 4. A means for sending the positioning measurement for the sidelink communication signal to a location server for positioning of the target UE may be, e.g., the wireless transceiver 510 and one or more processors 502 with dedicated hardware or implementing executable code or software instructions in memory 504 and/or medium 520 such as the position reporting unit 526.

In one implementation, the target UE may receive a request to establish a sidelink connection with the anchor UE, e.g., as discussed at stages 11a or 11b of FIG. 4. In one implementation, the anchor UE may receive either a request to establish a sidelink connection for the target UE or a request to wait for a sidelink connection from the target UE, e.g., as discussed at stages 11a or 11b of FIG. 4. A means for receiving either a request to establish a sidelink connection for the target UE or a request to wait for a sidelink connection from the target UE may be, e.g., the wireless transceiver 510 and one or more processors 502 with dedicated hardware or implementing executable code or software instructions in memory 504 and/or medium 520 such as the sidelink communication unit 522.

In one implementation, the target UE may receive sidelink communication resource scheduling, wherein the target UE sends the sidelink communication signal in response to the sidelink communication resource scheduling, e.g., as discussed at stage 12a of FIG. 4. For example, the target UE may receive the sidelink communication resource scheduling from a base station serving the target UE. The anchor UE may send a sidelink resource request to the location server, wherein the sidelink communication resource scheduling is sent in response to the sidelink resource request, e.g., as discussed at stage 12a of FIG. 4. A means for sending a sidelink resource request to the location server, wherein the sidelink communication resource scheduling is sent in response to the sidelink resource request may be, e.g., the wireless transceiver 510 and one or more processors 502 with dedicated hardware or implementing executable code or software instructions in memory 504 and/or medium 520 such as the position measurement unit 524.

In one implementation, the anchor UE may send a request for sidelink data to the target UE, wherein the target UE sends the sidelink communication signal in response to the request for sidelink data, e.g., as discussed at stages 13b and 14 of FIG. 4. A means for sending a request for sidelink data to the target UE, wherein the target UE sends the sidelink communication signal in response to the request for sidelink data may be, e.g., the wireless transceiver 510 and one or more processors 502 with dedicated hardware or implementing executable code or software instructions in memory 504 and/or medium 520 such as the sidelink communication unit 522 and the position measurement unit 524. The anchor UE may further receive from one of a serving base station or the location server a request to establish a sidelink connection with the target UE, wherein the request for sidelink data is sent to the target UE after the anchor UE establishes the sidelink connection with the target UE, e.g., as discussed at stage 11b of FIG. 4. A means for receiving from one of a serving base station or the location server a request to establish a sidelink connection with the target UE, wherein the request for sidelink data is sent to the target UE after the anchor UE establishes the sidelink connection with the target UE may be, e.g., the wireless transceiver 510 and one or more processors 502 with dedicated hardware or implementing executable code or software instructions in memory 504 and/or medium 520 such as the sidelink communication unit 522. The sidelink connection between the target UE and the anchor UE may be established before the request for sidelink data is sent by the anchor UE to the target UE.

Figure 8:
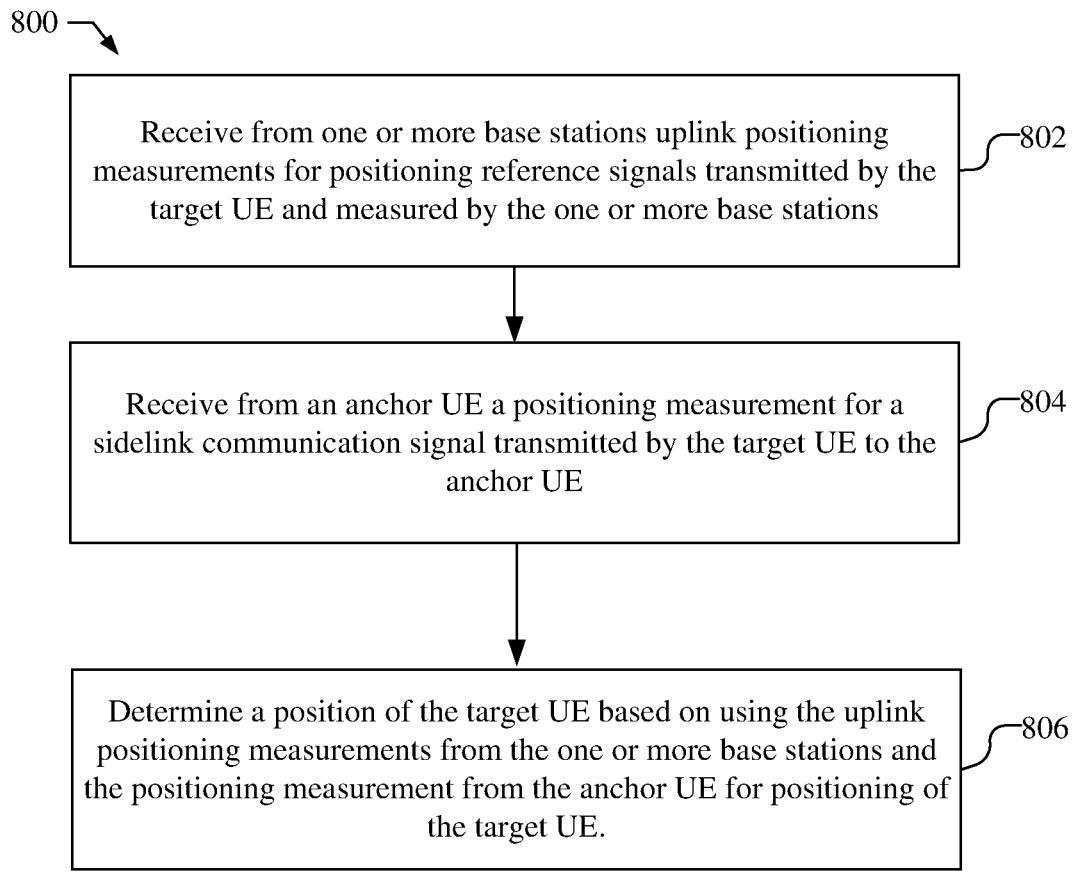
FIG. 8 shows a flowchart for an exemplary method to support positioning of a target UE.

FIG. 8 shows a flowchart for an exemplary method 800 performed by a location server, such as LMF 120, to support positioning of a target user equipment (UE), e.g., such as target UE 106, in a manner consistent with disclosed implementation.

At block 802, the location server may receive from one or more base stations uplink positioning measurements for positioning reference signals transmitted by the target UE and measured by the one or more base stations, e.g., as discussed at stage 10 of FIG. 4. A means for receiving from one or more base stations uplink positioning measurements for positioning reference signals transmitted by the target UE and measured by the one or more base stations may be, e.g., the external interface 610 and one or more processors 602 with dedicated hardware or implementing executable code or software instructions in memory 604 and/or medium 620 such as a position measurement unit 622.

At block 804, the location server may receive from an anchor UE a positioning measurement for a sidelink communication signal transmitted by the target UE to the anchor UE, e.g., as discussed at stage 16 of FIG. 4. The positioning measurement, for example, may be a timing measurement such as TOA, Rx-Tx, RTT, etc., an angle measurement such as AoA, a power measurement such as RSRP, or a combination thereof. The a sidelink communication signal, for example, may be, physical sidelink synchronization channel (PSSCH), a physical sidelink broadcast channel (PSBCH), a physical sidelink control channel (PSCCH), sidelink channel state information reference signal (SL-CSIRS), a physical sidelink feedback channel (PSFCH), a sidelink sounding reference signals (SL-SRS), or a combination thereof. A means for receiving from an anchor UE a positioning measurement for a sidelink communication signal transmitted by the target UE to the anchor UE may be, e.g., the external interface 610 and one or more processors 602 with dedicated hardware or implementing executable code or software instructions in memory 604 and/or medium 620 such as a position measurement unit 622.

At block 806, the location server may determine a position of the target UE based on the uplink positioning measurements from the one or more base stations and the positioning measurement from the anchor UE, e.g., as discussed at stage 17 of FIG. 4. A means for determining a position of the target UE based on the uplink positioning measurements from the one or more base stations and the positioning measurement from the anchor UE may be, e.g., the one or more processors 602 with dedicated hardware or implementing executable code or software instructions in memory 604 and/or medium 620 such as a position determination unit 624.

In one implementation, the location server may send sidelink communication resource scheduling to the target UE via a serving base station, wherein the target UE sends the a sidelink communication signal to the anchor UE in response to the sidelink communication resource scheduling, e.g., as discussed at stage 12a of FIG. 4. A means for sending sidelink communication resource scheduling to the target UE via a serving base station, wherein the target UE sends the a sidelink communication signal to the anchor UE in response to the sidelink communication resource scheduling may be, e.g., the external interface 610 and one or more processors 602 with dedicated hardware or implementing executable code or software instructions in memory 604 and/or medium 620 such as a sidelink positioning unit 626. The location server may further receive from the anchor UE a sidelink resource request for a sidelink communication signal to be sent from the target UE to the anchor UE, wherein the sidelink communication resource scheduling is sent to the target UE via the serving base station in response to the sidelink resource request, e.g., as discussed at stage 12a of FIG. 4. A means for receiving from the anchor UE a sidelink resource request for a sidelink communication signal to be sent from the target UE to the anchor UE, wherein the sidelink communication resource scheduling is sent to the target UE via the serving base station in response to the sidelink resource request may be, e.g., may be, e.g., the external interface 610 and one or more processors 602 with dedicated hardware or implementing executable code or software instructions in memory 604 and/or medium 620 such as a sidelink positioning unit 626.

The location server may further send a request via a serving base station to the target UE to establish a connection with the anchor UE, e.g., as discussed at stage 11a of FIG. 4. A means for sending a request via a serving base station to the target UE to establish a connection with the anchor UE may be, e.g., the external interface 610 and one or more processors 602 with dedicated hardware or implementing executable code or software instructions in memory 604 and/or medium 620 such as a sidelink positioning unit 626.

The location server may further send sending a request to the anchor UE, via a base station serving the anchor UE, to either establish a sidelink connection with the target UE or to wait for a connection from the target UE, e.g., as discussed at stages 11a or 11b of FIG. 4. A means for sending a request to the anchor UE, via a base station serving the anchor UE, to either search for the target UE or to wait for a connection from the target UE may be, e.g., the external interface 610 and one or more processors 602 with dedicated hardware or implementing executable code or software instructions in memory 604 and/or medium 620 such as a sidelink positioning unit 626.

In one implementation, the anchor UE may send a request for sidelink data to the target base station, wherein the target UE sends the a sidelink communication signal to the anchor UE in response to the request for sidelink data, e.g., as discussed at stages 13 and 14 of FIG. 4. The location server may send to the anchor UE a request to establish a sidelink connection with the target UE, wherein the request for sidelink data from the anchor UE is sent to the target UE after the anchor UE establishes the sidelink connection, as discussed at stage 11b of FIG. 4. A means for sending to the anchor UE a request to establish a sidelink connection with the target UE, wherein the request for sidelink data from the anchor UE is sent to the target UE after the anchor UE establishes the sidelink connection may be, e.g., the external interface 610 and one or more processors 602 with dedicated hardware or implementing executable code or software instructions in memory 604 and/or medium 620 such as a sidelink positioning unit 626. In one implementation, a sidelink connection between the target UE and the anchor UE may be established before the request for sidelink data is sent to the target base station.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of"

indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method by an anchor user equipment (UE) for supporting positioning of a target UE, comprising:
receiving a sidelink communication signal from the target UE, wherein the sidelink communication signal is one of a data signal, a data related reference signal, or a combination thereof;
performing a positioning measurement for the sidelink communication signal from the target UE; and
sending the positioning measurement for the sidelink communication signal to a location server for positioning of the target UE.

2. The method of clause 1, wherein the positioning measurement for the sidelink communication signal comprises a timing measurement, an angle measurement, a power measurement, or a combination thereof.

3. The method of either of clauses 1 or 2, wherein the sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

4. The method of any of clauses 1-3, wherein the target UE receives a request to establish a sidelink connection with the anchor UE.

5. The method of any of clauses 1-4, further comprising receiving either a request to establish a sidelink connection with the target UE or a request to wait for a sidelink connection from the target UE.

6. The method of any of clauses 1-5, wherein the target UE receives sidelink communication resource scheduling, wherein the target UE sends the sidelink communication signal in response to the sidelink communication resource scheduling.

7. The method of clause 6, further comprising sending a sidelink resource request by the anchor UE to the location server, wherein the sidelink communication resource scheduling is sent in response to the sidelink resource request.

8. The method of clause 6, wherein the target UE receives the sidelink communication resource scheduling from a base station serving the target UE.

9. The method of any of clauses 1-5, further comprising sending by the anchor UE a request for sidelink data to the target UE, wherein the target UE sends the sidelink communication signal in response to the request for sidelink data.

10. The method of clause 9, further comprising the anchor UE receiving from one of a serving base station or the location server a request to establish a sidelink connection with the target UE, wherein the request for sidelink data is sent to the target UE after the anchor UE establishes the sidelink connection with the target UE.

11. The method of clause 9, wherein a sidelink connection between the target UE and the anchor UE is established before the request for sidelink data is sent by the anchor UE to the target UE.

12. An anchor user equipment (UE) configured to support positioning of a target UE, comprising:
a wireless transceiver configured to wirelessly communicate with entities in a wireless network;
at least one memory; and
at least one processor coupled to the wireless transceiver and the at least one memory, wherein the at least one processor is configured to:
receive a sidelink communication signal from the target UE, wherein the sidelink communication signal is one of a data signal, a data related reference signal, or a combination thereof;
perform a positioning measurement for the sidelink communication signal from the target UE; and
send the positioning measurement for the sidelink communication signal to a location server for positioning of the target UE.

13. The anchor UE of clause 12, wherein the positioning measurement for the sidelink communication signal comprises a timing measurement, an angle measurement, a power measurement, or a combination thereof.

14. The anchor UE of either of clauses 12 or 13, wherein the sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

15. The anchor UE of any of clauses 12-14, wherein the target UE receives a request to establish a sidelink connection with the anchor UE.

16. The anchor UE of any of clauses 12-15, wherein the at least one processor is further configured to receive either a request to establish a sidelink connection with the target UE or a request to wait for a sidelink connection from the target UE.

17. The anchor UE of any of clauses 12-16, wherein the target UE receives sidelink communication resource scheduling, wherein the target UE sends the sidelink communication signal in response to the sidelink communication resource scheduling.

18. The anchor UE of clause 17, wherein the at least one processor is further configured to send a sidelink resource request by the anchor UE to the location server, wherein the sidelink communication resource scheduling is sent in response to the sidelink resource request.

19. The anchor UE of clause 17, wherein the target UE receives the sidelink communication resource scheduling from a base station serving the target UE.

20. The anchor UE of any of clauses 12-16, wherein the at least one processor is further configured to send by the anchor UE a request for sidelink data to the target UE, wherein the target UE sends the sidelink communication signal in response to the request for sidelink data.

21. The anchor UE of clause 20, wherein the at least one processor is further configured to receive from one of a serving base station or the location server a request to establish a sidelink connection with the target UE, wherein the request for sidelink data is sent to the target UE after the anchor UE establishes the sidelink connection with the target UE.

22. The anchor UE of clause 20, wherein a sidelink connection between the target UE and the anchor UE is established before the request for sidelink data is sent by the anchor UE to the target UE.

23. An anchor user equipment (UE) configured to support positioning of a target UE, comprising:

means for receiving a sidelink communication signal from the target UE, wherein the sidelink communication signal is one of a data signal, a data related reference signal, or a combination thereof;

means for performing a positioning measurement for the sidelink communication signal from the target UE; and means for sending the positioning measurement for the sidelink communication signal to a location server for positioning of the target UE.

24. The anchor UE of clause 23, wherein the sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

25. The anchor UE of either of clauses 23 or 24, wherein the target UE receives sidelink communication resource scheduling, wherein the target UE sends the sidelink communication signal in response to the sidelink communication resource scheduling.

26. The anchor UE of either of clauses 23 or 24, further comprising means for sending by the anchor UE a request for sidelink data to the target UE, wherein the target UE sends the sidelink communication signal in response to the request for sidelink data.

27. A non-transitory storage medium including program code stored thereon, the program code is operable to configure at least one processor in an anchor user equipment (UE) to support positioning of a target UE, comprising:

program code to receive a sidelink communication signal from the target UE, wherein the sidelink communication signal is one of a data signal, a data related reference signal, or a combination thereof;

program code to perform a positioning measurement for the sidelink communication signal from the target UE; and program code to send the positioning measurement for the sidelink communication signal to a location server for positioning of the target UE.

28. The non-transitory storage medium of clause 27, wherein the sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

29. The non-transitory storage medium of either of clauses 27 or 28, wherein the target UE receives sidelink communication resource scheduling, wherein the target UE sends the sidelink communication signal in response to the sidelink communication resource scheduling.

30. The non-transitory storage medium of either of clauses 27 or 28, further comprising program code to send by the anchor UE a request for sidelink data to the target UE, wherein the target UE sends the sidelink communication signal in response to the request for sidelink data.

31. A method by a location server for supporting positioning of a target user equipment (UE), comprising:

receiving from one or more base stations uplink positioning measurements for positioning reference signals transmitted by the target UE and measured by the one or more base stations;

receiving from an anchor UE a positioning measurement for a sidelink communication signal transmitted by the target UE to the anchor UE; and determining a position of the target UE based on the uplink positioning measurements from the one or more base stations and the positioning measurement from the anchor UE.

32. The method of clause 31, wherein the positioning measurement from the anchor UE comprises a timing measurement, an angle measurement, a power measurement, or a combination thereof.

33. The method of either of clauses 31 or 32, wherein the a sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

34. The method of any of clauses 31-33, further comprising sending sidelink communication resource scheduling to the target UE via a serving base station, wherein the target UE sends the a sidelink communication signal to the anchor UE in response to the sidelink communication resource scheduling.

35. The method of clause 34, further comprising receiving from the anchor UE a sidelink resource request for a sidelink communication signal to be sent from the target UE to the anchor UE, wherein the sidelink communication resource scheduling is sent to the target UE via the serving base station in response to the sidelink resource request.

36. The method of any of clauses 31-34, further comprising sending a request via a serving base station to the target UE to establish a sidelink connection with the anchor UE.

37. The method of any of clauses 31-34, further comprising sending a request to the anchor UE, via a base station serving the anchor UE, to either establish a sidelink connection with the target UE or to wait for a connection from the target UE.

38. The method of any of clauses 31-33, wherein the anchor UE sends a request for sidelink data to the target UE, wherein the target UE sends the a sidelink communication signal to the anchor UE in response to the request for sidelink data.

39. The method of clause 38, further comprising sending to the anchor UE a request to establish a sidelink connection with the target UE, wherein the request for sidelink data from the anchor UE is sent to the target UE after the anchor UE establishes the sidelink connection with the target UE.

40. The method of clause 38, wherein a sidelink connection between the target UE and the anchor UE is established before the request for sidelink data is sent to the target UE.

41. A location server configured to support positioning of a target user equipment (UE), comprising:
an external interface configured to communicate with entities in a wireless network;
at least one memory; and
at least one processor coupled to the external interface and the at least one memory, wherein the at least one processor is configured to:
receive from one or more base stations uplink positioning measurements for positioning reference signals transmitted by the target UE and measured by the one or more base stations;
receive from an anchor UE a positioning measurement for a sidelink communication signal transmitted by the target UE to the anchor UE; and
determine a position of the target UE based on the uplink positioning measurements from the one or more base stations and the positioning measurement from the anchor UE.

42. The location server of clause 41, wherein the positioning measurement from the anchor UE comprises a timing measurement, an angle measurement, a power measurement, or a combination thereof.

43. The location server of either of clauses 41 or 42, wherein the a sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

44. The location server of any of clauses 41-43, wherein the at least one processor is further configured to send sidelink communication resource scheduling to the target UE via a serving base station, wherein the target UE sends the a sidelink communication signal to the anchor UE in response to the sidelink communication resource scheduling.

45. The location server of clause 44, wherein the at least one processor is further configured to receive from the anchor UE a sidelink resource request for sidelink data to be sent from the target UE to the anchor UE, wherein the sidelink communication resource scheduling is sent to the target UE via the serving base station in response to the sidelink resource request.

46. The location server of any of clauses 41-44, wherein the at least one processor is further configured to send a request via a serving base station to the target UE to establish a sidelink connection with the anchor UE.

47. The location server of any of clauses 41-44, wherein the at least one processor is further configured to send a request to the anchor UE, via a base station serving the anchor UE, to either establish a sidelink connection with the target UE or to wait for a connection from the target UE.

48. The location server of any of clauses 41-43, wherein the anchor UE sends a request for sidelink data to the target UE, wherein the target UE sends the a sidelink communication signal to the anchor UE in response to the request for sidelink data.

49. The location server of clause 48, wherein the at least one processor is further configured to send to the anchor UE a request to establish a sidelink connection with the target UE, wherein the request for sidelink data from the anchor UE is sent to the target UE after the anchor UE establishes the sidelink connection with the target UE.

50. The location server of clause 48, wherein a sidelink connection between the target UE and the anchor UE is established before the request for sidelink data is sent to the target UE.

51. A location server configured to support positioning of a target user equipment (UE), comprising:
means for receiving from one or more base stations uplink positioning measurements for positioning reference signals transmitted by the target UE and measured by the one or more base stations;
means for receiving from an anchor UE a positioning measurement for a sidelink communication signal transmitted by the target UE to the anchor UE; and
means for determining a position of the target UE based on the uplink positioning measurements from the one or more base stations and the positioning measurement from the anchor UE.

52. The location server of clause 51, wherein the a sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

53. The location server of either of clauses 51 or 52, further comprising means for sending sidelink communication resource scheduling to the target UE via a serving base station, wherein the target UE sends the a sidelink communication signal to the anchor UE in response to the sidelink communication resource scheduling.

54. The location server of either of clauses 51 or 52, wherein the anchor UE sends a request for sidelink data to the target UE, wherein the target UE sends the a sidelink communication signal to the anchor UE in response to the request for sidelink data.

55. A non-transitory storage medium including program code stored thereon, the program code is operable to configure at least one processor in a location server to support positioning of a target user equipment (UE), comprising:

program code to receive from one or more base stations uplink positioning measurements for positioning reference signals transmitted by the target UE and measured by the one or more base stations;

program code to receive from an anchor UE a positioning measurement for a sidelink communication signal transmitted by the target UE to the anchor UE; and program code to determine a position of the target UE based on the uplink positioning measurements from the one or more base stations and the positioning measurement from the anchor UE.

56. The non-transitory storage medium of clause 55, wherein the a sidelink communication signal comprises at least one of physical sidelink synchronization channel (PSCCH), a physical sidelink broadcast channel (PSSCH), a physical sidelink control channel (PSBCH), sidelink channel state information reference signal (SL-CSIRS), a physical sidelink feedback channel (PSFCH), a sidelink sounding reference signals (SL-SRS), or a combination thereof.

57. The non-transitory storage medium of either of clauses 55 or 56, further comprising program code to send sidelink communication resource scheduling to the target UE via a serving base station, wherein the target UE sends the a sidelink communication signal to the anchor UE in response to the sidelink communication resource scheduling.

58. The non-transitory storage medium of either of clauses 55 or 56, wherein the anchor UE sends a request for sidelink data to the target UE, wherein the target UE sends the a sidelink communication signal to the anchor UE in response to the request for sidelink data.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method by an anchor user equipment (UE) for supporting positioning of a target UE, comprising:
   receiving a sidelink communication signal from the target UE, wherein the sidelink communication signal is one of a data signal, a data related reference signal, or a combination thereof, and wherein the sidelink communication signal sent from the target UE is not a positioning reference signal and comprises at least one of physical sidelink synchronization channel (PSCCH), a physical sidelink broadcast channel (PSSCH), a physical sidelink control channel (PSBCH), a physical sidelink feedback channel (PSFCH), a sidelink sounding reference signals (SL-SRS), or a combination thereof;
   performing a positioning measurement for the sidelink communication signal from the target UE; and
   sending the positioning measurement for the sidelink communication signal to a location server for positioning of the target UE.

2. The method of claim 1, wherein the positioning measurement for the sidelink communication signal comprises a timing measurement, an angle measurement, a power measurement, or a combination thereof.

3. The method of claim 1, further comprising receiving either a request to establish a sidelink connection with the target UE or a request to wait for a sidelink connection from the target UE.

4. The method of claim 1, further comprising sending a sidelink resource request by the anchor UE to the location server.

5. The method of claim 1, further comprising sending by the anchor UE a request for sidelink data to the target UE.

6. The method of claim 5, further comprising the anchor UE receiving from one of a serving base station or the location server a request to establish a sidelink connection with the target UE, wherein the request for sidelink data is sent to the target UE after the anchor UE establishes the sidelink connection with the target UE.

7. The method of claim 5, wherein a sidelink connection between the target UE and the anchor UE is established before the request for sidelink data is sent by the anchor UE to the target UE.

8. An anchor user equipment (UE) configured to support positioning of a target UE, comprising:
   a wireless transceiver configured to wirelessly communicate with entities in a wireless network;
   at least one memory; and
   at least one processor coupled to the wireless transceiver and the at least one memory, wherein the at least one processor is configured to:
   receive a sidelink communication signal from the target UE, wherein the sidelink communication signal is one of a data signal, a data related reference signal, or a combination thereof, and wherein the sidelink communication signal sent from the target UE is not a positioning reference signal and comprises at least one of physical sidelink synchronization channel (PSCCH), a physical sidelink broadcast channel (PSSCH), a physical sidelink control channel (PSBCH), a physical sidelink feedback channel (PSFCH), a sidelink sounding reference signals (SL-SRS), or a combination thereof;
   perform a positioning measurement for the sidelink communication signal from the target UE; and
   send the positioning measurement for the sidelink communication signal to a location server for positioning of the target UE.

9. The anchor UE of claim 8, wherein the positioning measurement for the sidelink communication signal comprises a timing measurement, an angle measurement, a power measurement, or a combination thereof.

10. The anchor UE of claim 8, wherein the at least one processor is further configured to receive either a request to establish a sidelink connection with the target UE or a request to wait for a sidelink connection from the target UE.

11. The anchor UE of claim 8, wherein the at least one processor is further configured to send a sidelink resource request by the anchor UE to the location server.

12. The anchor UE of claim 8, wherein the at least one processor is further configured to send by the anchor UE a request for sidelink data to the target UE.

13. The anchor UE of claim 12, wherein the at least one processor is further configured to receive from one of a serving base station or the location server a request to establish a sidelink connection with the target UE, wherein the request for sidelink data is sent to the target UE after the anchor UE establishes the sidelink connection with the target UE.

14. The anchor UE of claim 12, wherein a sidelink connection between the target UE and the anchor UE is established before the request for sidelink data is sent by the anchor UE to the target UE.

15. An anchor user equipment (UE) configured to support positioning of a target UE, comprising:
  means for receiving a sidelink communication signal from the target UE, wherein the sidelink communication signal is one of a data signal, a data related reference signal, or a combination thereof, and wherein the sidelink communication signal sent from the target UE is not a positioning reference signal and comprises at least one of physical sidelink synchronization channel (PSCCH), a physical sidelink broadcast channel (PSSCH), a physical sidelink control channel (PSBCH), a physical sidelink feedback channel (PSFCH), a sidelink sounding reference signals (SL-SRS), or a combination thereof;
  means for performing a positioning measurement for the sidelink communication signal from the target UE; and
  means for sending the positioning measurement for the sidelink communication signal to a location server for positioning of the target UE.

16. The anchor UE of claim 15, wherein the positioning measurement for the sidelink communication signal comprises a timing measurement, an angle measurement, a power measurement, or a combination thereof.

17. The anchor UE of claim 15, further comprising a means for receiving either a request to establish a sidelink connection with the target UE or a request to wait for a sidelink connection from the target UE.

18. The anchor UE of claim 15, further comprising means for sending by the anchor UE a request for sidelink data to the target UE.

19. The anchor UE of claim 18, further comprising means for receiving from one of a serving base station or the location server a request to establish a sidelink connection with the target UE, wherein the request for sidelink data is sent to the target UE after the anchor UE establishes the sidelink connection with the target UE.

20. The anchor UE of claim 18, wherein a sidelink connection between the target UE and the anchor UE is established before the request for sidelink data is sent by the anchor UE to the target UE.

21. A non-transitory storage medium including program code stored thereon, the program code is operable to configure at least one processor in an anchor user equipment (UE) to support positioning of a target UE, comprising:
  program code to receive a sidelink communication signal from the target UE, wherein the sidelink communication signal is one of a data signal, a data related reference signal, or a combination thereof, and wherein the sidelink communication signal sent from the target UE is not a positioning reference signal and comprises at least one of physical sidelink synchronization channel (PSCCH), a physical sidelink broadcast channel (PSSCH), a physical sidelink control channel (PSBCH), a physical sidelink feedback channel (PSFCH), a sidelink sounding reference signals (SL-SRS), or a combination thereof;
  program code to perform a positioning measurement for the sidelink communication signal from the target UE; and
  program code to send the positioning measurement for the sidelink communication signal to a location server for positioning of the target UE.

22. The non-transitory storage medium of claim 21, wherein the positioning measurement for the sidelink communication signal comprises a timing measurement, an angle measurement, a power measurement, or a combination thereof.

23. The non-transitory storage medium of claim 21, further comprising program code to receive either a request to establish a sidelink connection with the target UE or a request to wait for a sidelink connection from the target UE.

24. The non-transitory storage medium of claim 21, further comprising program code to send by the anchor UE a request for sidelink data to the target UE.

25. The non-transitory storage medium of claim 24, further comprising program code to receive from one of a serving base station or the location server a request to establish a sidelink connection with the target UE, wherein the request for sidelink data is sent to the target UE after the anchor UE establishes the sidelink connection with the target UE.

26. The non-transitory storage medium of claim 24, wherein a sidelink connection between the target UE and the anchor UE is established before the request for sidelink data is sent by the anchor UE to the target UE.

* * * * *